US009489504B2

(12) United States Patent
Yang et al.

(10) Patent No.: US 9,489,504 B2
(45) Date of Patent: Nov. 8, 2016

(54) PHYSICALLY UNCLONABLE FUNCTION PATTERN MATCHING FOR DEVICE IDENTIFICATION

(71) Applicant: QUALCOMM Incorporated, San Diego, CA (US)

(72) Inventors: Yafei Yang, Escondido, CA (US); Xu Guo, San Diego, CA (US); David Merrill Jacobson, San Diego, CA (US); Brian Marc Rosenberg, San Diego, CA (US); Adam John Drew, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 14/045,740

(22) Filed: Oct. 3, 2013

(65) Prior Publication Data
US 2015/0101037 A1 Apr. 9, 2015

(51) Int. Cl.
*G06F 21/00* (2013.01)
*G06F 21/44* (2013.01)
*H04L 9/32* (2006.01)
*G09C 1/00* (2006.01)

(52) U.S. Cl.
CPC .............. *G06F 21/44* (2013.01); *G09C 1/00* (2013.01); *H04L 9/3278* (2013.01)

(58) Field of Classification Search
CPC combination set(s) only.
See application file for complete search history.

(56) References Cited

U.S. PATENT DOCUMENTS

| 8,782,396 | B2* | 7/2014 | Ziola | G06F 21/31 |
| | | | | 713/155 |
| 2005/0154858 | A1* | 7/2005 | Kravec | G06F 13/4027 |
| | | | | 712/11 |
| 2009/0083833 | A1 | 3/2009 | Ziola et al. | |
| 2011/0317829 | A1 | 12/2011 | Ficke et al. | |
| 2012/0183135 | A1* | 7/2012 | Paral | G09C 1/00 |
| | | | | 380/44 |

(Continued)

OTHER PUBLICATIONS

International Search Report and Written Opinion—PCT/US2014/058676—ISA/EPO—Feb. 6, 2015.

(Continued)

*Primary Examiner* — Anthony Brown
*Assistant Examiner* — William Corum, Jr.
(74) *Attorney, Agent, or Firm* — Loza & Loza, LLP

(57) ABSTRACT

A method is provided for using obtaining a reproducible device identifier from a physically unclonable function. An authentication device may receive a first physically unclonable function (PUF) dataset from the electronic device, the first PUF dataset including characteristic information generated from a physically unclonable function in the electronic device. The authentication device may then identify a pre-stored PUF dataset corresponding to the electronic device. Authentication of the electronic device may be performed by correlating the pre-stored PUF dataset and the first PUF dataset for the electronic device, wherein such correlation is based on a pattern or distribution correlation the pre-stored PUF dataset and the first PUF dataset. Because such correlation is performed on datasets, and not individual points, systematic variations can be recognized by the correlation operation leading to higher correlation than point-by-point comparisons.

26 Claims, 16 Drawing Sheets

Collection of PUF Frequency Datasets at a Pre-Deployment Stage

(56) References Cited

U.S. PATENT DOCUMENTS

| | | | | |
|---|---|---|---|---|
| 2012/0300988 | A1* | 11/2012 | Ivanov | G06K 9/00006 382/115 |
| 2012/0313753 | A1* | 12/2012 | Miller | 340/5.82 |
| 2013/0010957 | A1 | 1/2013 | Yu et al. | |
| 2013/0019324 | A1* | 1/2013 | Tehranipoor | H03K 3/0315 726/34 |
| 2013/0047209 | A1* | 2/2013 | Satoh | H04L 9/3278 726/2 |
| 2014/0270177 | A1* | 9/2014 | Brickell et al. | 380/278 |
| 2014/0279532 | A1* | 9/2014 | Tremlet | 705/44 |
| 2014/0283015 | A1* | 9/2014 | Ancona Novelo et al. | 726/19 |
| 2016/0188296 | A1* | 6/2016 | Plusquellic | G06F 7/588 708/190 |

OTHER PUBLICATIONS

Van Den Berg R., et al., "Entropy analysis of Physical Unclonable Functions", Aug. 31, 2012 (Aug. 31, 2012), XP055164950, 88 Pages, Retrieved from the Internet: URL: http://alexandria.tue.nl/extra1/afstversl/wsk-i/vandenberg2012.pdf [retrieved on Jan. 26, 2015].

Zdenek S.P., et al., "Reliable and Efficient PUF-Based Key Generation Using Pattern Matching", Hardware-Oriented Security and Trust (HOST), 2011 IEEE International Symposium on, Jun. 5, 2011 (Jun. 5, 2011), XP055165655, pp. 128-133, ISBN: 978-1-45-771059-9.

* cited by examiner

*Collection of PUF Frequency Datasets at a Pre-Deployment Stage*

*Method Operational on Data Collector Device*

*Method Operational on Electronic Device*

PHYSICALLY UNCLONABLE FUNCTION PATTERN MATCHING FOR DEVICE IDENTIFICATION

BACKGROUND

1. Field

The present disclosure pertains to device identification of devices using characteristics from a physically unclonable function.

2. Background

Physical Unclonable functions (PUFs) provide a mechanism to uniquely identify a hardware device based on intrinsic variations of physical components. When multiple chips are manufactured, the complex semiconductor process introduces slight variations that are beyond the control of the designer. For instance, even if two chips are manufactured from the same silicon wafer, wires designed to be the same will probably differ in width by a few nanometers; microscopic differences in the surface of the silicon will induce almost trivial variations in the curvature of lines. As these unique characteristics are uncontrollable and inherent to the physical device, quantifying them can produce an intrinsic identifier.

However, many devices operate with limited power sources and/or at low power levels (e.g., low voltage). Additionally, such devices may also operate under varying environmental or operating conditions (e.g., temperature variations, etc.). Because PUFs may operate under different power (e.g., voltage) and or environmental (e.g., temperature) conditions, this may affect the characteristic response of the PUF. That is, such voltage and/or temperature variations may change the PUF response, making it difficult to use the PUF for identification purposes.

Aging effects on semiconductor devices may also affect the frequency response of a PUF. For instance, where a PUF includes one or more ring oscillators, the frequency response of the one or more ring oscillators may change over time.

Consequently, there is a need for a method to permit using a PUF for identification purposes even in light of variations that may result from power/voltage and/or temperature variations.

SUMMARY

An authentication device is provided for using physically unclonable function pattern matching for device identification. A device identifier associated with an electronic device may be received by the authentication device. The pre-stored PUF dataset may be obtained at a manufacturing stage or pre-deployment stage of the electronic device. Additionally, a first physically unclonable function (PUF) dataset may also be received from the electronic device, the first PUF dataset including characteristic information generated from a physically unclonable function in the electronic device. A pre-stored PUF dataset corresponding to the electronic device may be identified using the electronic device identifier. The electronic device may be authenticated, by the authentication device, by correlating the pre-stored PUF dataset and the first PUF dataset for the electronic device, wherein such correlation is based on a pattern or distribution correlation the pre-stored PUF dataset and the first PUF dataset.

In one exemplary implementation, the authentication device may send a dataset request to the electronic device prior to receiving the first PUF dataset. The dataset request may identify elements corresponding to the pre-stored dataset for which new characteristic information is sought. In one example, the dataset request may be obtained or generated by the authentication device based on the device identifier.

In one example, the characteristic information generated from the physically unclonable function may include information for individual elements of the physically unclonable function. In another example, the characteristic information generated from the physically unclonable function may include frequency values for individual ring oscillators of the physically unclonable function.

Correlating the pre-stored PUF dataset and the first PUF dataset for the electronic device may include obtaining a Pearson product-moment correlation coefficient over the pre-stored PUF dataset and the first PUF dataset. If the correlation coefficient is greater than a threshold value, then the electronic device is successfully authenticated. In some implementations, only a subset of the successfully authenticated datasets sent by the electronic device are stored by the authentication device.

Similarly, an electronic device is provided for facilitating device identification using physically unclonable function pattern matching. The electronic device may include a pre-stored device identifier and may implement a physically unclonable function using a plurality of ring oscillators within the electronic device. The electronic device may obtain a dataset including characteristic responses from a plurality of elements of the physically unclonable function. The dataset including the obtained characteristic responses may then be sent to the external server. In one example, the electronic device may receive a dataset request characterizing the physically unclonable function from an external server. Additionally, the electronic device may receive an indicator that the dataset was successfully authenticated by the external server.

DETAILED DESCRIPTION

Figure 1:
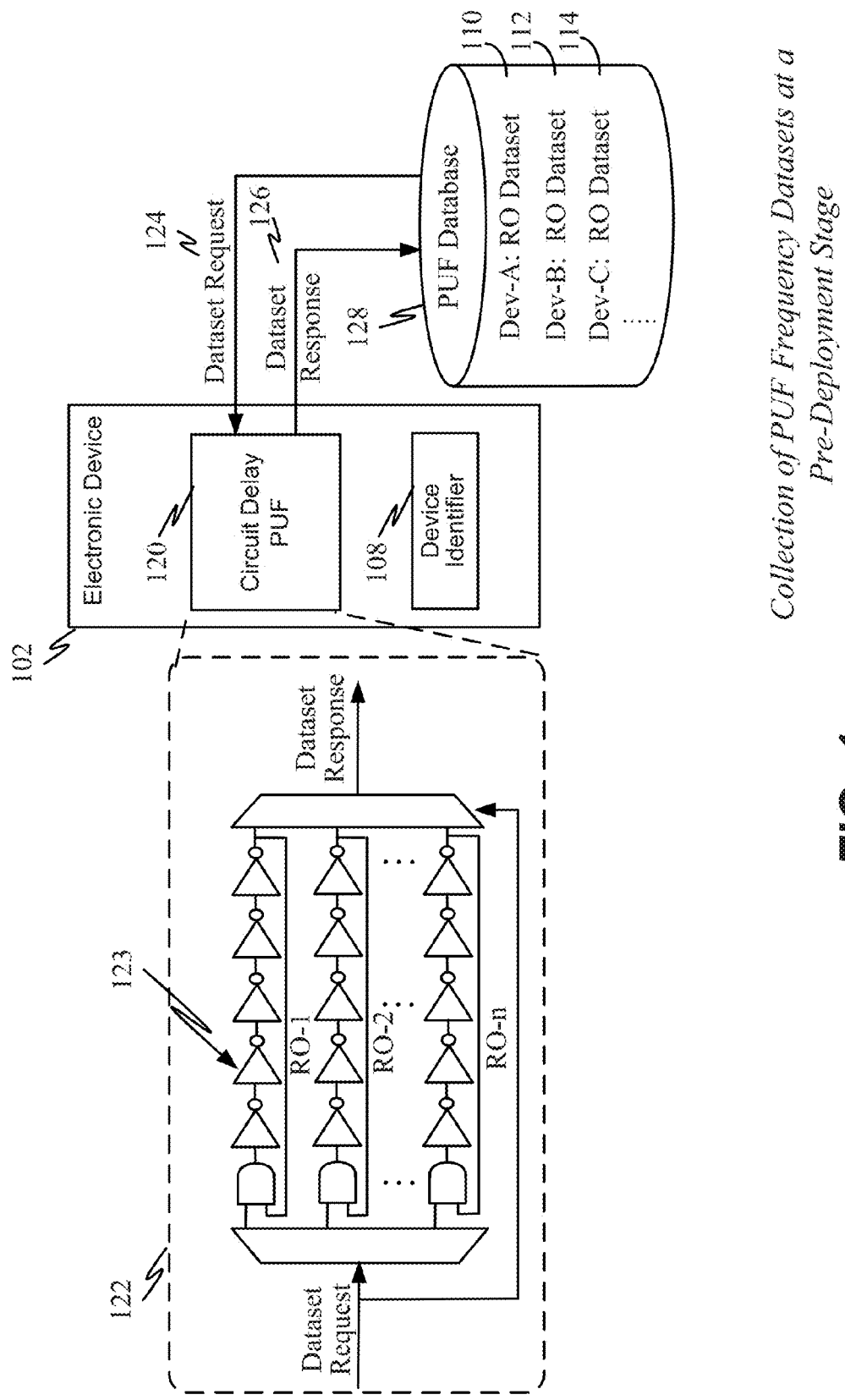
FIG. 1 is a block diagram illustrating an exemplary way of characterizing an electronic device using a Circuit Delay Based PUF, e.g., Ring Oscillator (RO) PUF, during a pre-deployment stage.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

A method is provided for generating unique device identifiers based on probabilistic approach which recognizes that PUF frequency distributions for a device are highly correlated despite voltage variations and/or thermal variations.

Each device (e.g., integrated circuit, semiconductor, chip, processor, etc.) is provisioned with a plurality of PUFs (e.g., ring oscillators) which may serve to uniquely identify a device. The unique identifier provided by such PUFs (e.g., a dataset of frequencies for the ring oscillators) are stored at a database during a manufacturing process. Subsequently, when the device is placed in operation, it can be uniquely identified by requesting that it provide its PUF-generated identifier. Despite variations in operating voltage and/or temperature (e.g., relative to the time when the unique identifier was recorded), the identifiers for a device are correlated above a threshold and, thus, matched.

One feature provides for obtaining a first dataset of a device's ring oscillators frequencies at a time t1 (e.g., at a pre-deployment stage). At a subsequent time (e.g., during an authentication or identification stage) a second dataset of the device's ring oscillator frequencies is obtained at a time t2. The first and second dataset are then compared, as a correlation of the overall patterns formed by the dataset, to ascertain whether a match exists.

Exemplary Operating Environment

A Physical Unclonable Function (PUF) is a challenge-response mechanism exploiting manufacturing process variations within circuits to obtain a unique identifier. In one example, the relation between a challenge and the corresponding response is determined by complex, statistical variations in logic components and interconnects in a circuit (e.g., integrated circuit). Two types of PUFs include, for example, an SRAM PUF and a circuit delay PUF (e.g., Ring Oscillator PUF).

Circuit delay based PUFs exploit systematic variations between oscillation circuits caused by fabrication and/or manufacturing imperfections. While fabrication and/or manufacturing processes seek to avoid such variations in circuit delay based PUFs, they are always present to some extent and are actually useful to identify devices/chips. In one example of a circuit delay based PUF, a plurality of ring oscillators may be concurrently used and the outputs of at least two ring oscillators are sent to one or more switches (multiplexers). The challenge may serve as input to the ring oscillators (e.g., challenge serves to select two ring oscillators) and the output from two selected ring oscillators are represented as a first frequency and a second frequency. Because of differences between the selected ring oscillators, their frequencies will be different (i.e., resulting in a frequency differential). The RO PUF output (response) is created by a pair-wise comparison of the ring oscillator frequencies (e.g., difference between first and second frequency). Multiple responses (e.g., combinations of outputs from an RO PUF) may be used to generate a device identifier.

Such challenge/response approach to PUF matching relies on individual comparisons of responses (i.e., point-by-point comparisons) to ascertain whether a match exists. However, environmental and/or operating conditions may result in variations in the individual responses from a circuit delay based PUF. This makes it difficult to find a match between a response at time t1 and a later response at time t2 for the same circuit delay based PUF.

Instead, one feature provides for comparing a first dataset of ring oscillator frequencies at a first time to a second dataset of ring oscillator frequencies at a second time. This comparison is not done point-by-point but rather as a comparison of patterns (e.g., the shape of frequency distributions). So, the shape or pattern (e.g., distribution) of the first and second datasets (of RO frequencies) are compared rather than individual point-by-point comparisons.

FIG. 1 is a block diagram illustrating an exemplary way of characterizing an electronic device using a Circuit Delay Based PUF, e.g., Ring Oscillator (RO) PUF, during a pre-deployment stage. This block diagram illustrates the process of querying and collecting frequency characteristics for an electronic device 102 (e.g., integrated circuit, chip, semiconductor device, processor, etc.) comprising a Circuit Delay PUF 122 (e.g., implemented as a ring oscillator bank).

In one example, the circuit delay PUF 120 may be implemented as a Ring Oscillator (RO) PUF 122 which makes use of a plurality of ring oscillators 123 and their frequency variations to generate a unique dataset of frequencies. For instance, for a given dataset request 124, a corresponding dataset (e.g., frequency output for all ring oscillators or some subset of ring oscillators) is obtained. In this manner, a dataset 126 (e.g., image) of the frequency distributions for a set of ring oscillators is obtained and may be stored in a PUF database 128. That is, the PUF database 128 may be built, for example, during a pre-deployment stage (e.g., during a manufacturing or quality control process). For instance, for a first Device-A a first dataset (e.g., RO frequency outputs) 110 is obtained, for a second Device-B a second dataset 112 is obtained, and for a third Device-C a third dataset 114 is obtained.

In order to associate the dataset s with each electronic device, a device identifier 108 (e.g., serial number, ID number, etc.) may be stored at the electronic device 102 and known to, or stored at, the database 128. That is, the device identifier 108 for each electronic device 102 may be stored and associated with the corresponding dataset for that electronic device 102.

Figure 2:
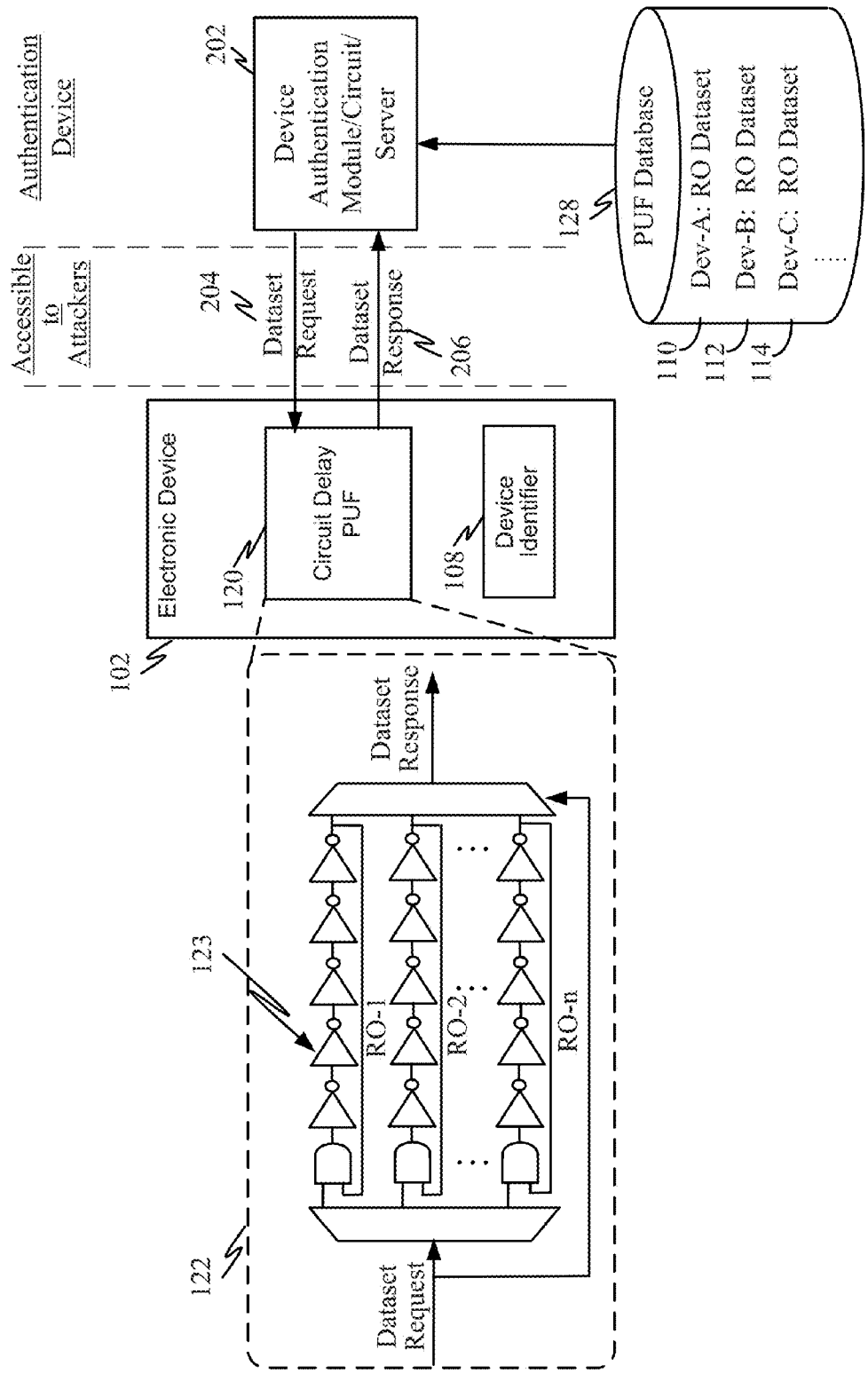
FIG. 2 is a block diagram illustrating an exemplary way of authenticating, verifying, and/or identifying a particular electronic device using previously obtained characteristic frequency distributions for the electronic device using a Circuit Delay Based PUF, e.g., Ring Oscillator (RO) PUF.

FIG. 2 is a block diagram illustrating an exemplary way of authenticating, verifying, and/or identifying a particular electronic device using previously obtained characteristic frequency distributions for the electronic device using a Circuit Delay Based PUF, e.g., Ring Oscillator (RO) PUF. During operation, a device verification module/circuit/server 202 may request a dataset 204 from the electronic device 102 to obtain a dataset response 206 which can be verified using the Circuit Delay PUF database 128. The dataset response 206 may serve to verify the identity of the electronic device 102 or to authenticate the electronic device 102. Note that this technique may also serve to generate a unique identifier/signature for the electronic device 102.

In one example, the electronic device 102 may provide its pre-stored/pre-assigned device identifier 108 to the device authentication module/circuit/server 202. The device authentication module/circuit/server 202 may then send a dataset request 204 (e.g., request for ring oscillator frequencies and/or distribution) to the electronic device 102. In various examples, the dataset request 204 may be a request for the output frequency values for every ring oscillator in the circuit delay PUF 120 or may be a request for a specific subset of ring oscillators in the circuit delay PUF 120.

In response to the dataset request 204, the device 102 may provide a dataset response 206 of its ring oscillators (e.g., frequency values for each ring oscillator). Upon receipt of the dataset response 206, the device authentication module/circuit/server 202 compares the received dataset 206 to the corresponding previously stored dataset 110 to ascertain whether there is a match.

Figure 3:
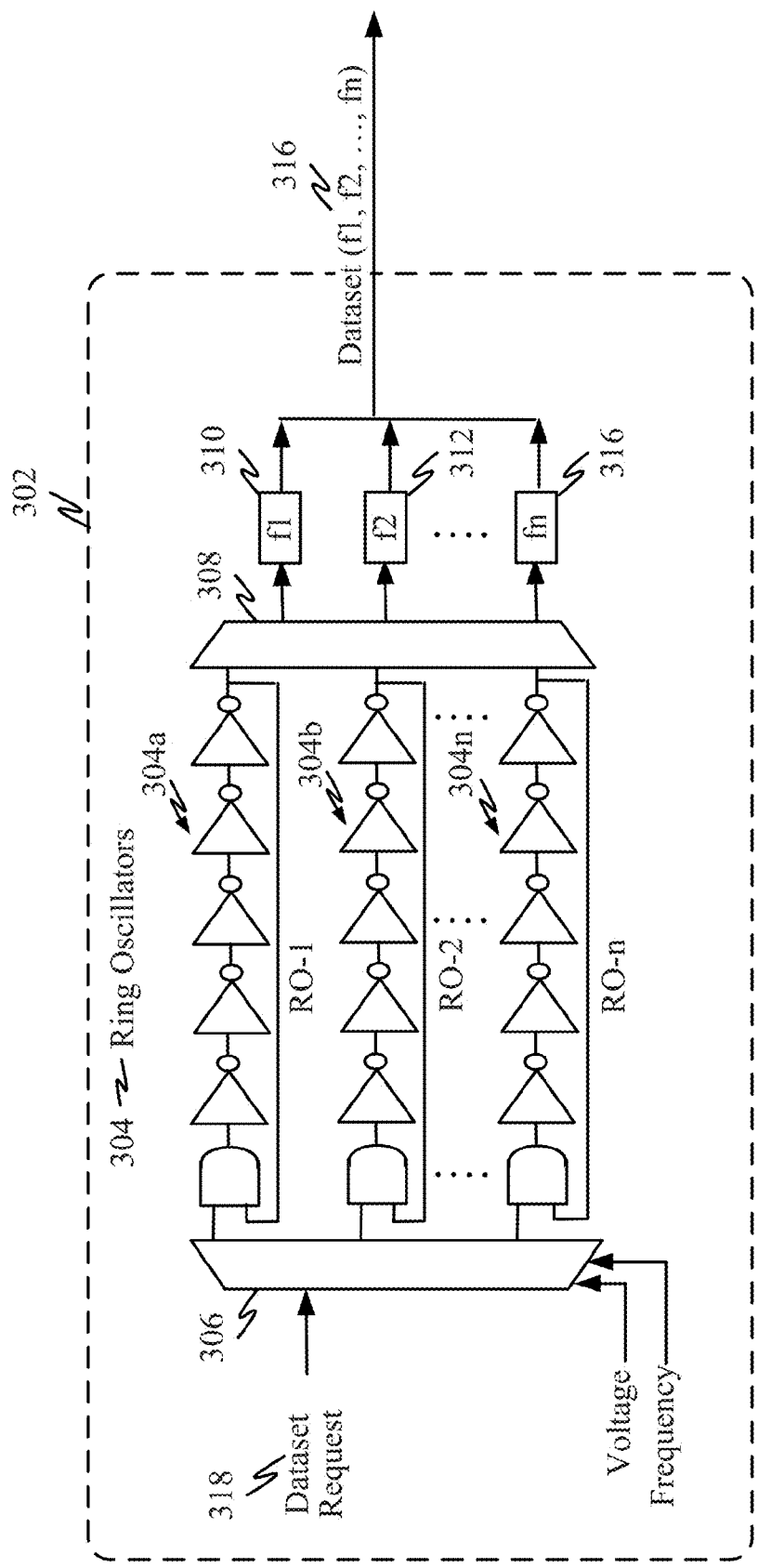
FIG. 3 is a block diagram illustrating how an exemplary physically unclonable function (PUF) based on a plurality of ring oscillators may be implemented according to one example.

FIG. 3 is a block diagram illustrating how an exemplary PUF 302 based on a plurality of ring oscillators 304 may be implemented according to one example. A reverse multiplexer 306 may receive a dataset request 318 for all or a subset of the ring oscillators 304a, 304b, 304c. This causes each of the requested ring oscillators 304a, 304b, 304c to provide a frequency f1 310, f2 312, fn 312 as an output via a multiplexer 308. These frequencies f1 310, f2 312, fn 312 may then be sent as a dataset response 316. It should be noted that the operating frequency and/or voltage of the PUF may be configurable and may change from time to time.

Figure 4:
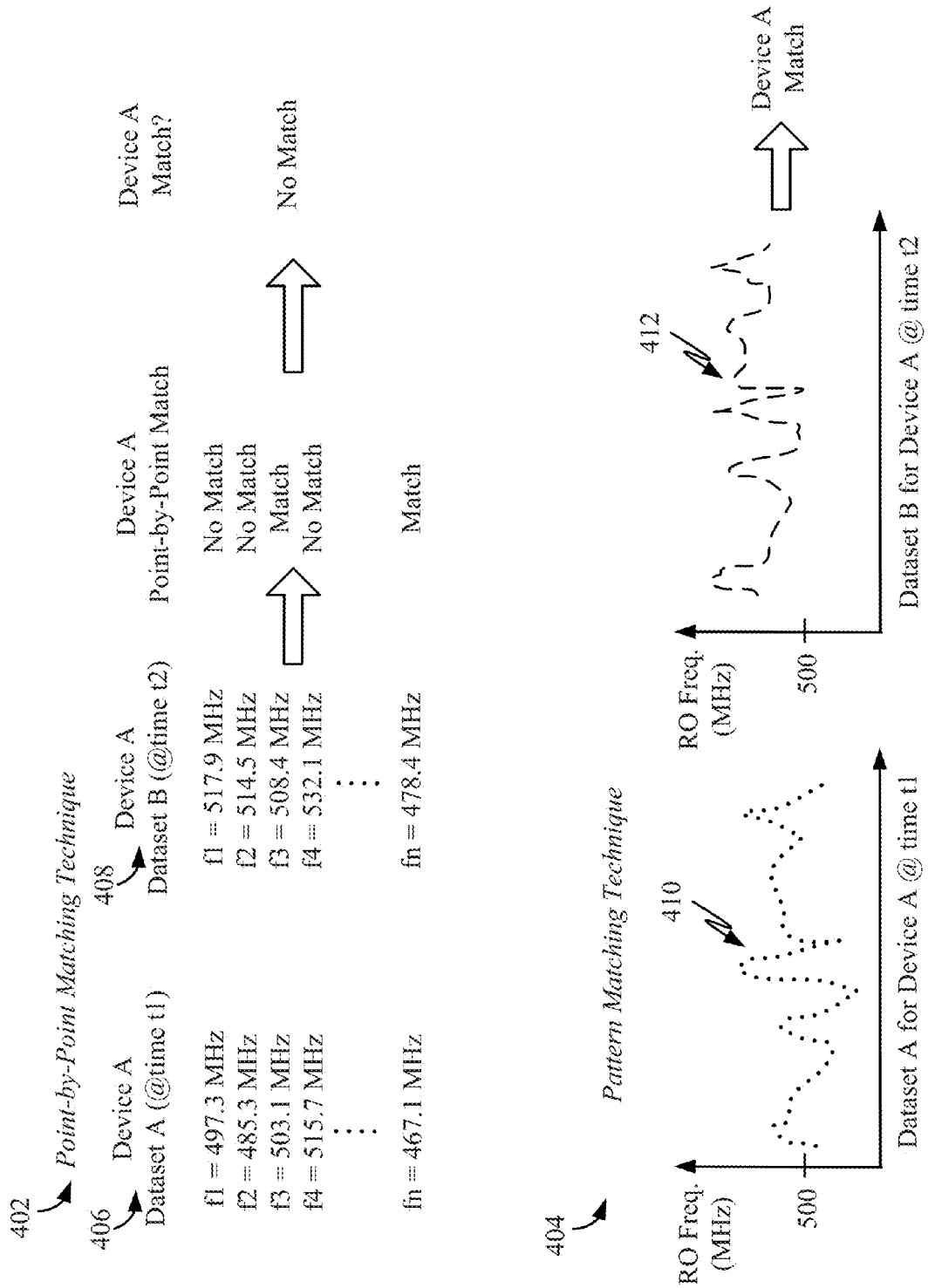
FIG. 4 illustrates one example of how a first PUF dataset and second PUF dataset may be compared.

FIG. 4 illustrates one example of how a first PUF dataset and second PUF dataset (e.g., frequency characteristic responses) may be compared. In one example, each dataset may include frequency values for ring oscillators of a PUF (e.g., one frequency for each ring oscillator). Note that while some examples described herein may use PUF frequency responses (e.g., ring oscillator frequencies) as datasets, these datasets should be more broadly construed to include other types of PUF characteristics (e.g., current path delays, electrical characteristics for different for one or more paths/circuits/components, etc.) not just frequencies.

According to a first approach, a point-by-point matching technique 402 involves comparing a first frequency response obtained at a first time t1 to a second frequency response obtained at a time t2. However, as previously noted, a problem exists when trying to compare PUF frequency responses obtained at a pre-deployment stage (as in FIG. 1) to PUF frequency responses at a post-deployment stage (as in FIG. 2) due to variations in operating voltages and/or temperatures between the pre-deployment measurement (Dataset A at time t1 406) and a post-deployment measurement (Dataset B at time t2 408). These operating voltage and/or temperature variations may make it difficult to match characteristic PUF responses obtained at different times. That is, even for the same challenges (e.g., selection of ring oscillators), a PUF may have different frequency responses which would prevent the PUF from being used for identity and/or authentication purposes. As can be appreciated from Dataset A 406 and Dataset B 408 for the same challenge, the individual ring oscillator frequencies between time t1 and time t2 may vary enough that no point-to-point match is found for many corresponding points. Consequently, no match may be found to Device A even though both datasets 406 and 408 are for Device A.

Rather than using a point-by-point comparison (response by response comparison) to ascertain a match between PUF responses at a first time and responses at a second time, a pattern matching approach 404 correlates between a first set of points 410 (dataset A) obtained at a first time t1 (e.g., plurality of ring oscillator frequencies obtained at a first time) and a second set of points 412 (dataset B) obtained at a second time t2 (e.g., plurality of ring oscillator frequencies obtained at a second time). In particular, systematic variations within the sets of points are treated as a "signal" and random variations are treated as "noise". As can be appreciated from the shape or pattern of dataset A 410 and dataset B 412, even though the frequencies for many individual points may have changed (e.g., no point-by-point match), there is a correlation in the overall pattern of the points (e.g., frequencies) when dataset A and B are taken as a whole. When systematic variations are considered, any two datasets from the same device have a high correlation (e.g., greater than 0.8), and any two datasets from two different devices have much lower correlation, a "match" may be ascertained for two datasets for the same device despite the random variations that may occur as a result of operating voltage and/or temperature variations.

Random and Systematic Variations in a PUF

There are two spatial silicon variations in a Ring Oscillator (RO) based PUF: random and systematic. A systematic variation is caused by fabrication/manufacturing imperfections. While fabrication/manufacturing processes seek to avoid such variations in RO-PUF, they are always present to some extent and are actually useful to identify devices (e.g., chips, semiconductors, circuits, processors, etc.). The frequency distribution caused by systematic variations is unique for each device that incorporates a PUF and may be quantized as illustrated in FIGS. 1-4. It is herein observed that such frequency distribution is robust under thermal (temperature) variations and voltage fluctuations.

According to one aspect, statistical signal processing may be applied to identify a device. Here, a systematic variation is treated as a "signal" and a random variation is treated as "noise". The "signal" is unique per device and hidden among "noise". Any two datasets (e.g., ring oscillator frequency responses) from the same device have a high correlation (e.g., greater than 0.8), and any two datasets from two different devices have much lower correlation.

Before a device is shipped to be integrated into an electronic device (e.g., mobile phone, etc.), its PUF responses (e.g., frequencies for ring oscillators) may be measured and stored (as a PUF dataset) with a device serial number. When the electronic device requests to access a remote server, network, or data, it may be asked to provide a second PUF dataset (e.g., measurements of current PUF frequencies). On the server side, the second dataset and the first dataset (stored in database) may be used to calculate a correlation value across all dataset measurements. If this correlation value meets a correlation threshold, the electronic device may be successfully authenticated or identified (e.g., allowed access to certain services, data, etc.). In this approach, no prior frequency information need be stored in the electronic device except for a device serial number.

Figure 5:
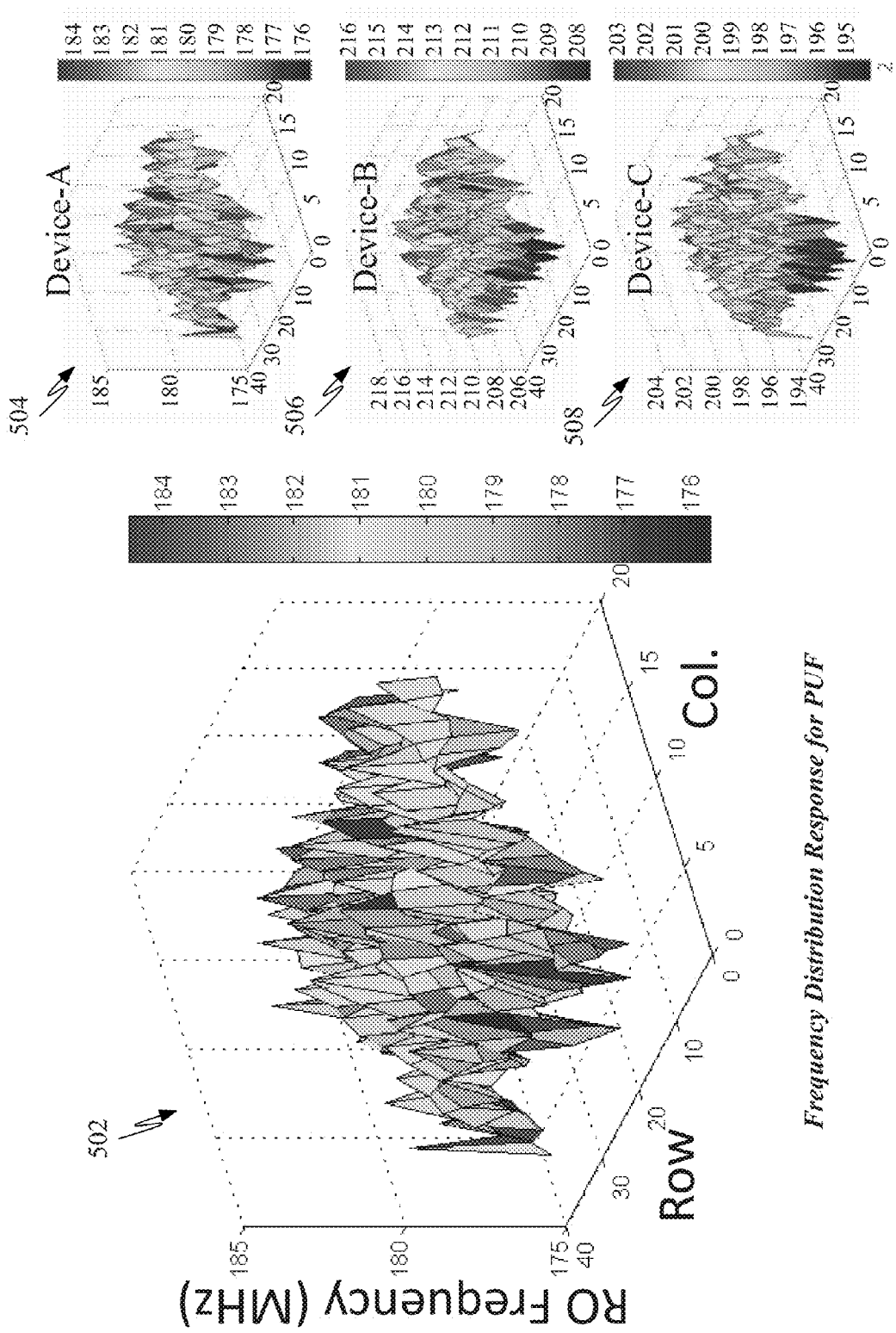
FIG. 5 illustrates the datasets of ring oscillator frequencies for exemplary PUFs.

FIG. 5 illustrates the datasets of ring oscillator frequencies for exemplary PUFs. For example, each PUF may be implemented as a field programmable gate array (FPGS) that is 32 rows by 16 columns, thereby providing 512 outputs (e.g., ring oscillator frequency responses). A dataset 502 may include a plurality of frequency values/responses corresponding to different elements (e.g., ring oscillators) of PUF. The dataset 502 illustrates a characteristic frequency distribution 502 for multiple points (e.g., ring oscillators). As can be appreciated, the frequency or response of a ring oscillator may vary (e.g., variation in output frequency of ring oscillator). The different datasets 504, 506, and 508 (e.g., PUF output frequency responses) of three different PUF devices are shown, illustrating the uniqueness of each PUF output.

Figure 6:
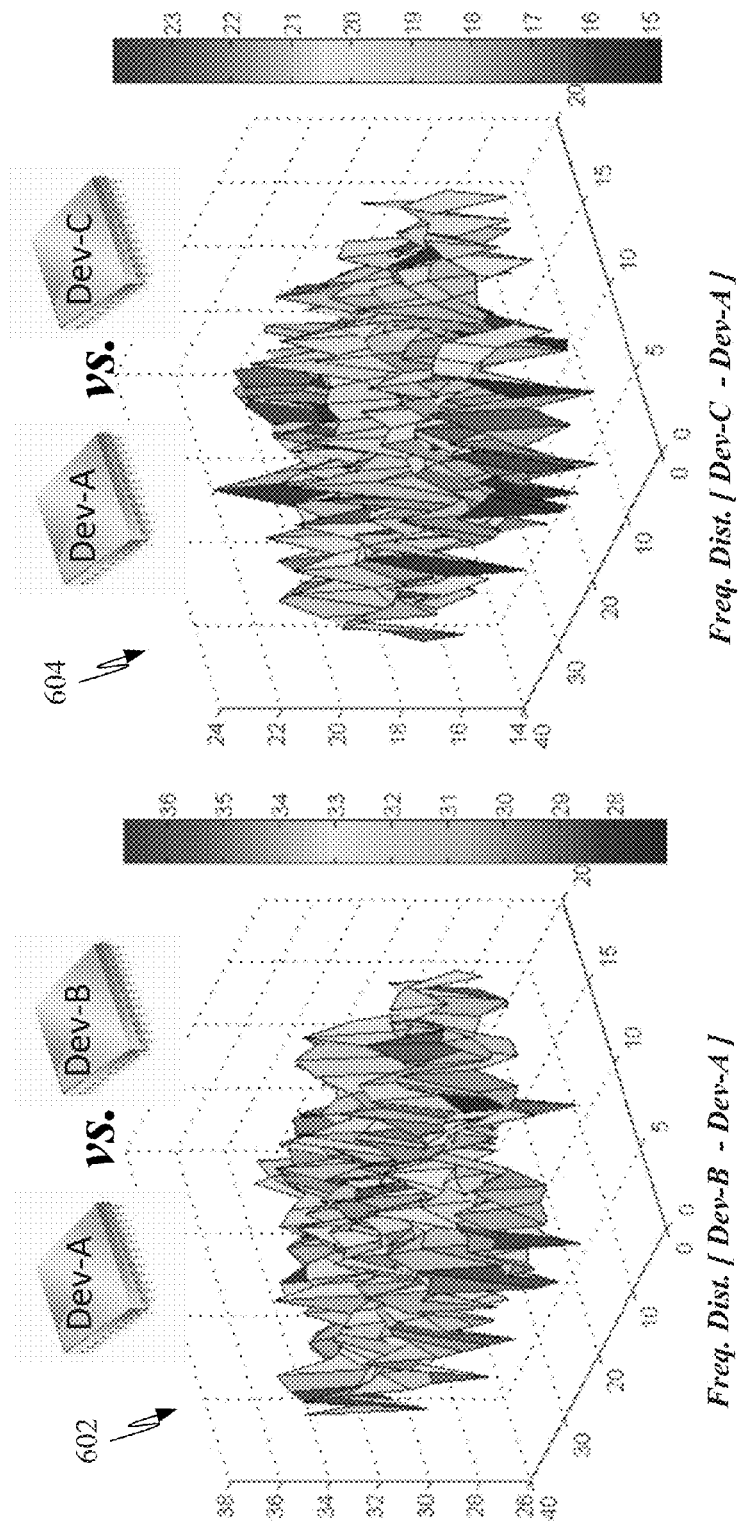
FIG. 6 illustrates the comparison of datasets for the PUFs of three different devices.

FIG. 6 illustrates the comparison of datasets (e.g., ring oscillator frequencies) for the PUFs of three different devices. As can be appreciated, a first PUF output correlation 602 between Device A and Device B is only 0.4322 while a second PUF output correlation 604 between Device A and Device C is only 0.4551.

One example of how PUF correlations may be obtained is the Pearson product-moment correlation coefficient ρ. In this example, a measure of the correlation ρ (i.e., dependence) between two variables X and Y (e.g., PUF frequencies obtained at different times) may be defined by the equation:

$$\rho_{X,Y} = \frac{\text{cov}(X, Y)}{\sigma_X \sigma_Y} = \frac{E[(X - \mu_X)(Y - \mu_Y)]}{\sigma_X \sigma_Y}$$

Here, Pearson's correlation coefficient ρ between two variables X and Y is defined as the covariance (cov) of the two variables X, Y divided by the product of their standard deviations $\sigma_X$ and $\sigma_Y$. This covariance cov (X, Y) may be represented as the expected value operator E of the product of the random variable X minus an expected value $\mu_X$ and Y minus an expected value $\mu_Y$. The correlation coefficient ρ ranges from −1 to 1, such that:
  1: the relationship between X and Y perfectly, with all data points lying on a line for which Y increases as X increases;
  −1: implies that all data points lie on a line for which Y decreases as X increases;
  0: implies that there is no correlation between the variables.

In one implementation, X may represent a first array of points at a first time t1 and Y may represent a second array of points at a second time t2. For instance, X may represent a first array of points (e.g., first dataset) such as frequency values for a plurality of ring oscillators at the first time t1. Similarly, Y may represent a second array of points (e.g., second dataset) such as frequency values for the same plurality of ring oscillators at the second time t2. Thus, the Pearson's correlation coefficient ρ is obtained over the two arrays (i.e., over two patterns of points) rather than a point by point basis. Note that by using such pattern based correlation, the effect of systematic fluctuations that may occur for each point, from the first time t1 to the second time t2, is minimized. Instead, by correlating over patterns of points (i.e., correlating arrays of points), systematic variations (e.g., variations that apply to all or most points) between the sets of points are minimized for purposes of correlation. That is, while point-to-point correlation fails to recognize the distinction between systematic variations and random variations, implementing correlations over whole arrays of points (e.g., patterns or datasets) can recognize and/or compensate for systematic variations (e.g., resulting from temperature changes, voltage changes, etc.).

Figure 7:
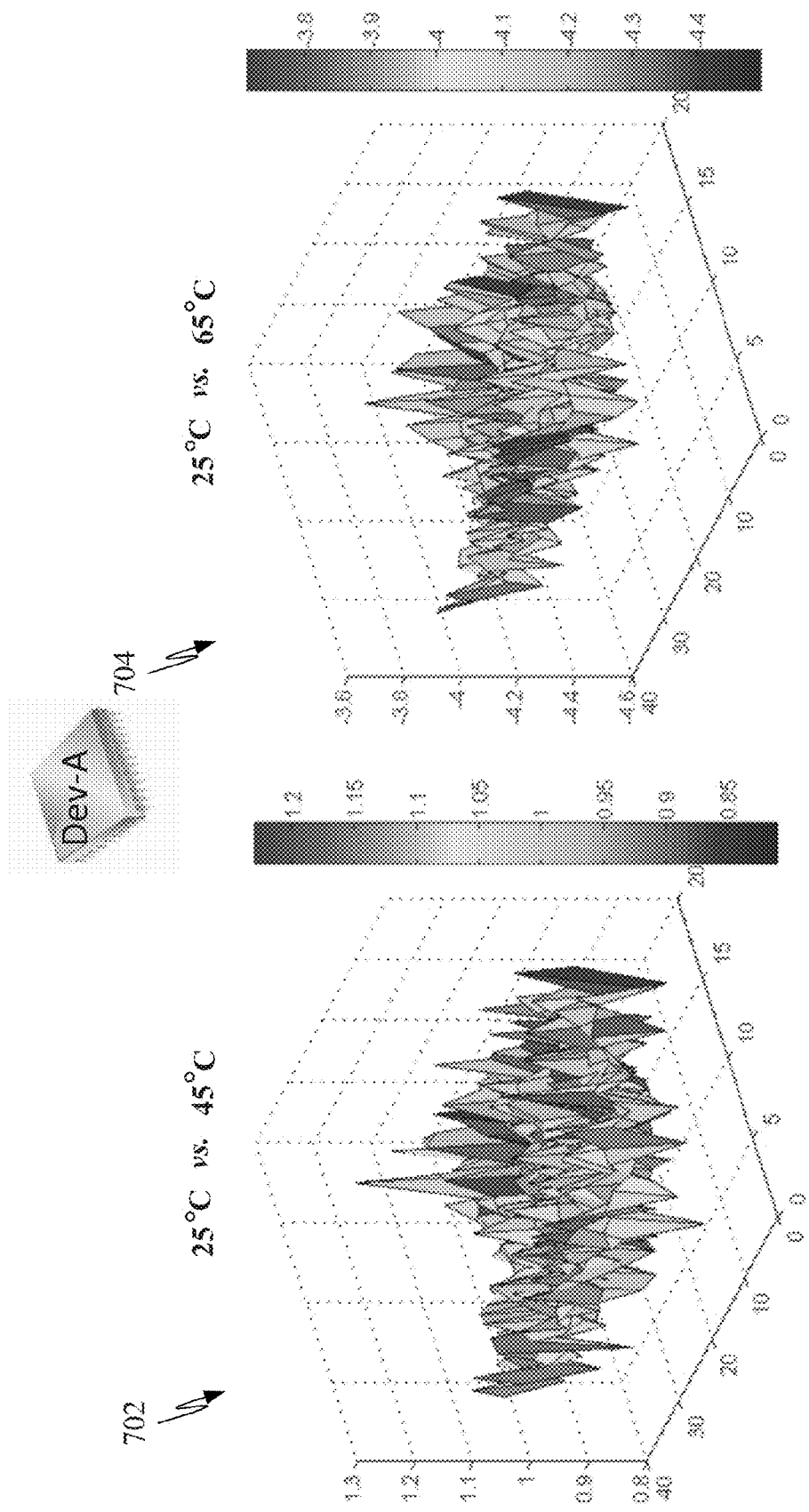
FIG. 7 illustrates the comparison of datasets for a PUF of a first device at different temperatures.

FIG. 7 illustrates the comparison of datasets (e.g., ring oscillator frequencies) for a PUF of a first device at different temperatures. As can be appreciated, a first PUF output correlation 702 for Device A at 25 degrees Celsius and 45 degrees Celsius is 0.9982. Likewise, a second PUF output correlation 704 for the Device A at 25 degrees Celsius and 65 degrees Celsius is 0.9975. Thus, despite thermal variations, the PUF datasets for the same device are highly correlated.

Figure 8:
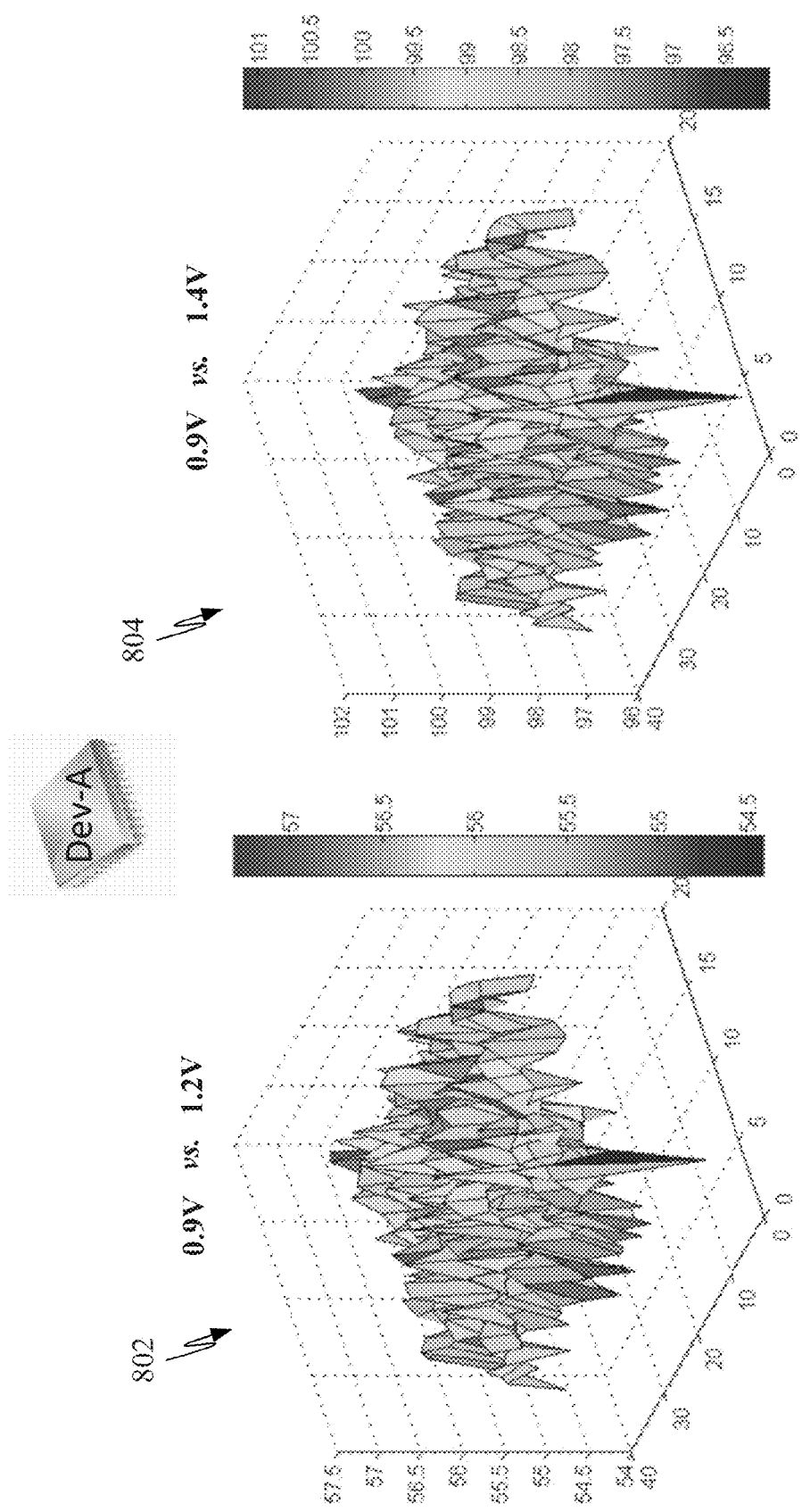
FIG. 8 illustrates the comparison of datasets for a PUF of a first device at different voltages.

FIG. 8 illustrates the comparison of datasets (e.g., ring oscillator frequencies) for a PUF of a first device at different voltages. As can be appreciated, a first PUF output correlation 802 for Device A at 0.9 Volts and 1.2 Volts is 0.9534. Likewise, a second PUF output correlation 804 for Device A at 0.9 Volts and 1.4 Volts is 0.8769. Thus, despite voltage variations, the datasets (e.g., PUF frequency responses, etc.) for the same Device A are highly correlated.

Figure 9:
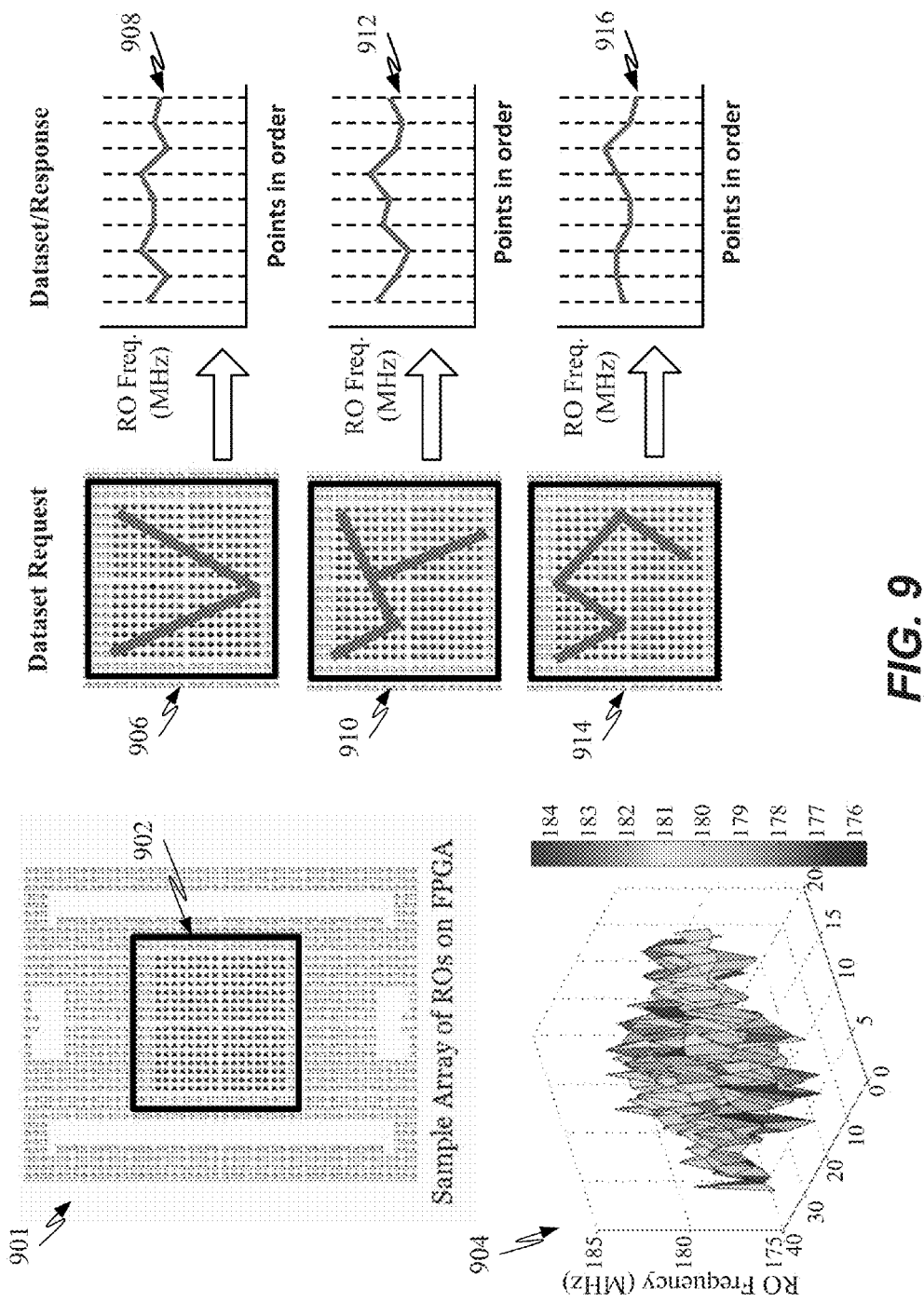
FIG. 9 illustrates how a subset or sub-region of ring oscillators (RO) may be used to provide PUF datasets for a device.

FIG. 9 illustrates how a subset or sub-region of ring oscillators (RO) may be used to provide PUF datasets (e.g., ring oscillator frequencies) for a device. Additionally, a subset of available points (i.e., ring oscillators) 906, 910, 914 for a PUF may be used to generate different datasets 908, 912, and 916, respectively, for a device. Note that such datasets may be a snap shot of the PUF response at for any period of time.

Figure 10:
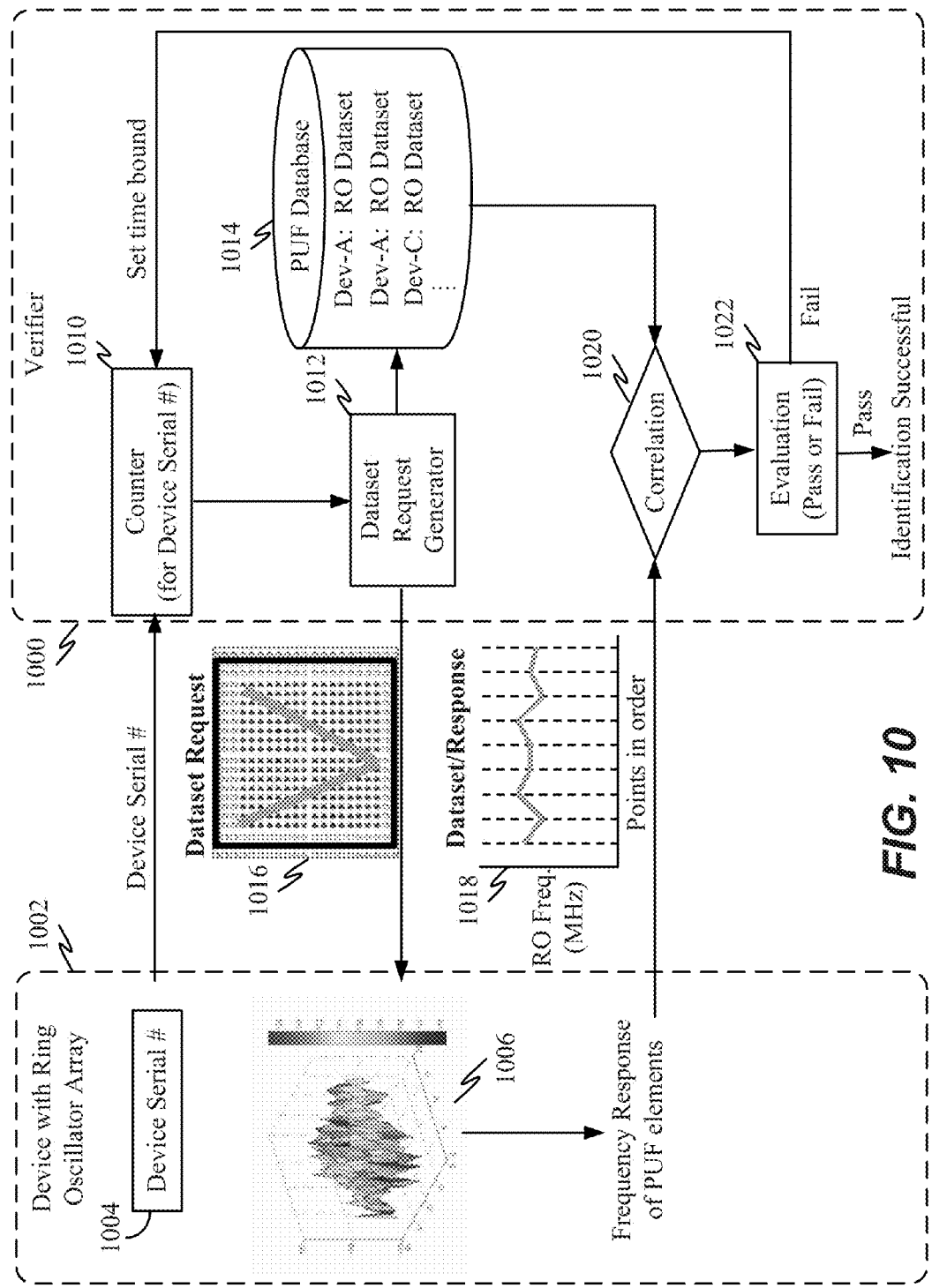
FIG. 10 illustrates a system for generating and using a PUF to uniquely identify a device despite thermal and/or voltage variations.

FIG. 10 illustrates a system for generating and using a PUF to uniquely identify a device despite thermal and/or voltage variations. Upon manufacturing of a device 1002, a serial number 1004 (e.g., obtained from a counter 1010, timestamp, etc.) is associated with the device 1002. A dataset request generator 1012 may then use the device serial number to request a particular dataset 1016 from the PUF (e.g., ring oscillator array) of the device 1002 and obtain a dataset 1006 of frequencies for the PUF. A dataset response 1006 with the PUF frequencies is then sent to the PUF database 1014. Alternatively, the dataset request 1016 may be generated independent of the device serial number (e.g., randomly generated) but associated and/or stored with the device serial number in a PUF database 1014. The serial number, dataset request, and dataset response for the device 1002 may be stored in the PUF database 1014. This process is repeated for each device.

During deployment of the device 1002, the device 1002 may be identified by sending the dataset request 1016 from a verifier 1000 to the device 1002 and requesting that the device 1002 provide a dataset response 1018 using its PUF. The dataset response 1018 may then be correlated 1020 to the previously stored dataset in a PUF database 1014 to determine if there is a statistical/probabilistic match (i.e., correlation above a threshold value) based on the distribution, shape, and/or patterns of the frequencies between an initial dataset (e.g., first dataset) and a subsequent dataset (a second dataset).

Exemplary Data Collector Device and Method Operational Therein

Figure 11:
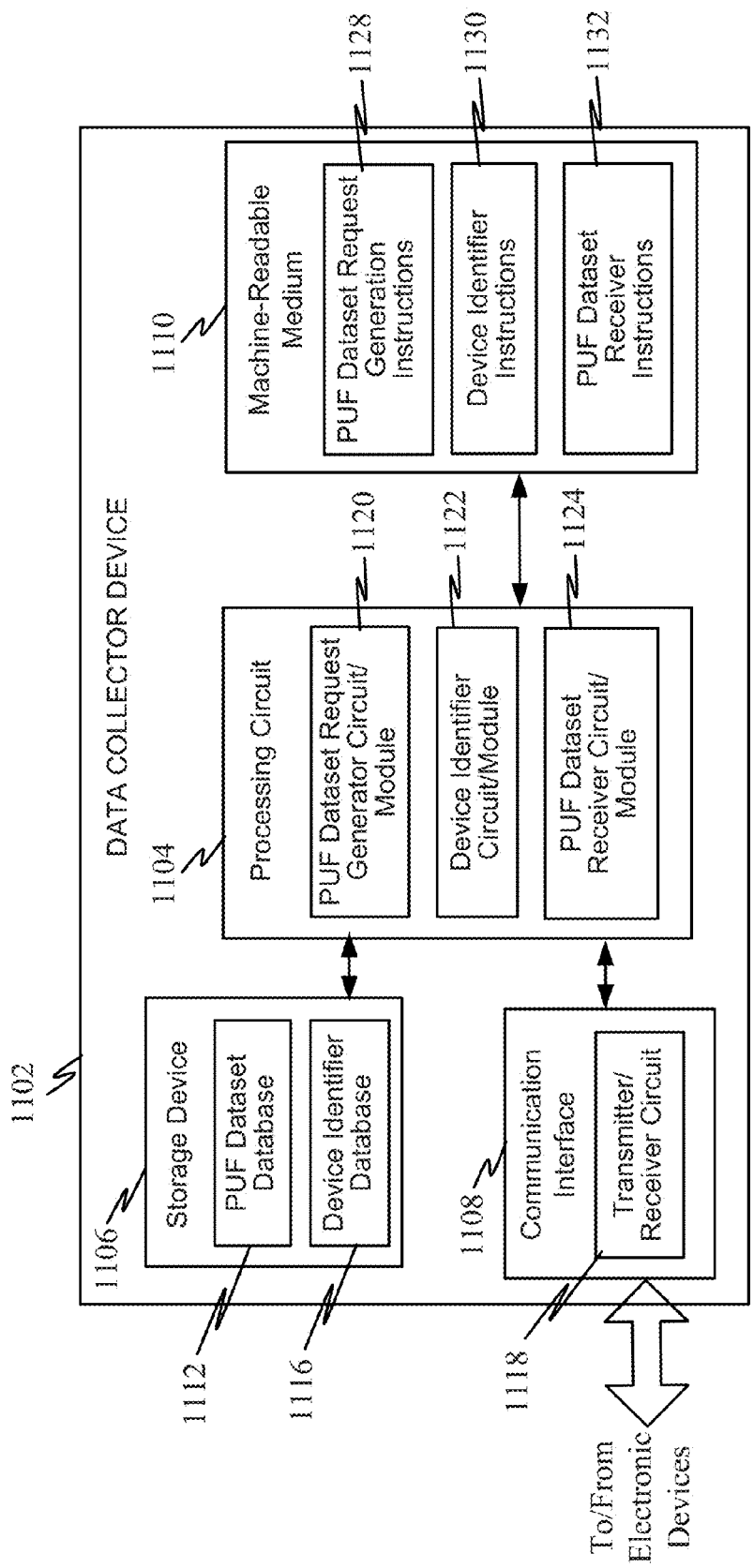
FIG. 11 is a block diagram illustrating a data collector device according to one example.

FIG. 11 is a block diagram illustrating a data collector device according to one example. The data collector device 1102 may be adapted to collect and store information that uniquely characterizes electronic devices (e.g., chips, semiconductors, processors, integrated circuits, memory devices, etc.). For example, during a manufacturing stage, quality control stage, and/or pre-deployment stage, the data collector device 1102 may be adapted to send a PUF dataset request and receive a PUF dataset response for PUFs (e.g., ring oscillators) for each electronic device and stores the received information for later use in authenticating/identifying each electronic device.

The data collector device 1102 may include a processing circuit 1104, a storage device 1106, a communication interface 1108, and/or a machine-readable medium 1110. The communication interface 1108 may include a transmitter/receiver circuit 1118 that permits the data collector device 1102 to communicate (e.g., wired or wirelessly) with one or more electronic devices.

The processing circuit 1104 may include a device identifier circuit/module 1122 adapted to obtain a unique identifier for each electronic device and store such unique identifier in a device identifier database 1116 in the storage device 1106. The processing circuit 1104 may also include a PUF dataset request generator circuit/module 1120 adapted to generate and send out a dataset request for a PUF response/image of an electronic device. For instance, the PUF dataset request may request the frequency values for all or a specific subset of ring oscillators of a PUF. The processing circuit 1104 may also include a PUF dataset receiver circuit/module 1124 adapted to receive PUF dataset responses.

The machine-readable medium 1110 may include or store device identifier instructions 1130 (e.g., to cause the processing circuit to obtain a device identifier from an electronic device being queried), PUF dataset request generator instructions 1128 (e.g., to cause the processing circuit to generate/send a PUF dataset request to an electronic device being queried), PUF dataset receiver instructions 1132 (e.g., to cause the processing circuit to collect or receive a PUF dataset from the electronic device being queried).

The data collector device 1102 may be adapted to perform one or more of the steps or functions illustrated in FIGS. 1-10.

Figure 12:
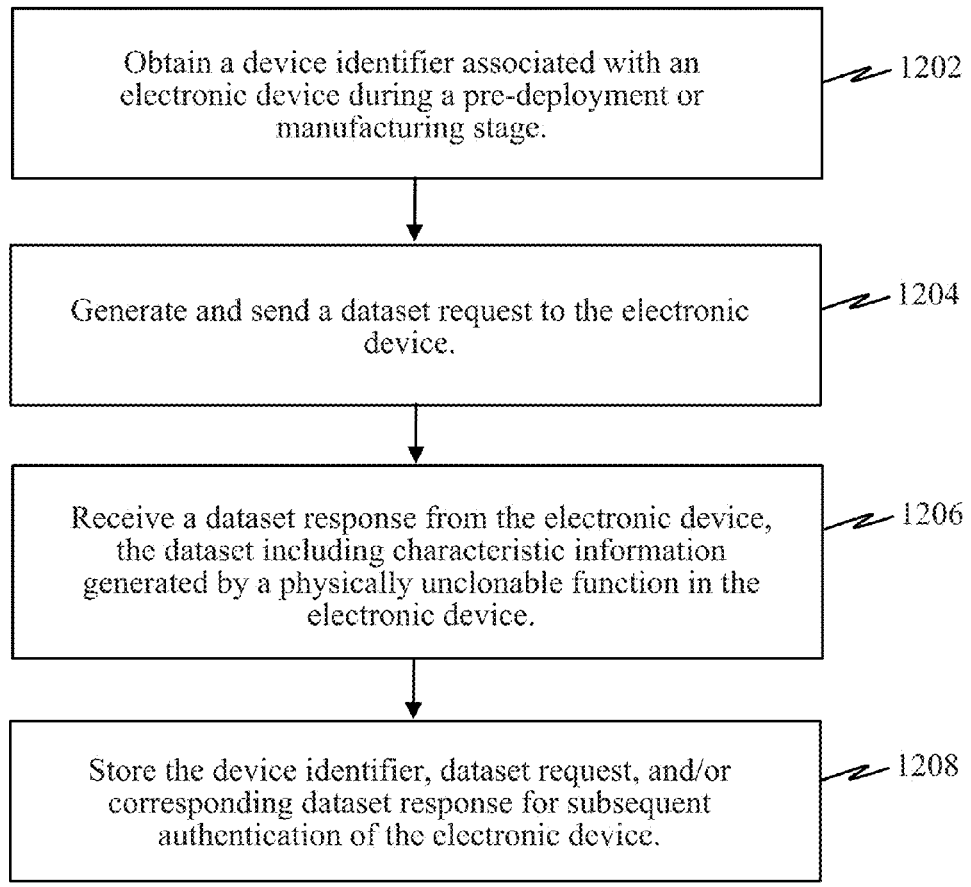
FIG. 12 illustrates a method operational in a data collector device for obtaining characteristic information from an electronic device.

FIG. 12 illustrates a method operational in a data collector device for obtaining characteristic information from an electronic device. The data collector device may obtain (e.g., receive or assign) a device identifier associated with an electronic device during a pre-deployment or manufacturing stage 1202. The data collector device may then generate and send a dataset request to the electronic device 1204. As a result, the data collector device may receive a dataset response from the electronic device, the dataset responses including characteristic information generated by a physically unclonable function in the electronic device 1206. For example, such characteristic information may include the frequency values (e.g., [f1, f2, f3, ... , fn]) of all or a subset of ring oscillators of the physically unclonable function. The device identifier, dataset request, and/or corresponding dataset response are stored for subsequent authentication of the electronic device 1208. This process may be repeated for each of a plurality of electronic devices. Note that the dataset requests sent to a plurality of electronic devices may be the same for all devices, may be randomly generated for each electronic device, and/or may be a subset of possible points (e.g., ring oscillator outputs) of a PUF dataset.

Exemplary Authentication Device and Method Operational Therein

Figure 13:
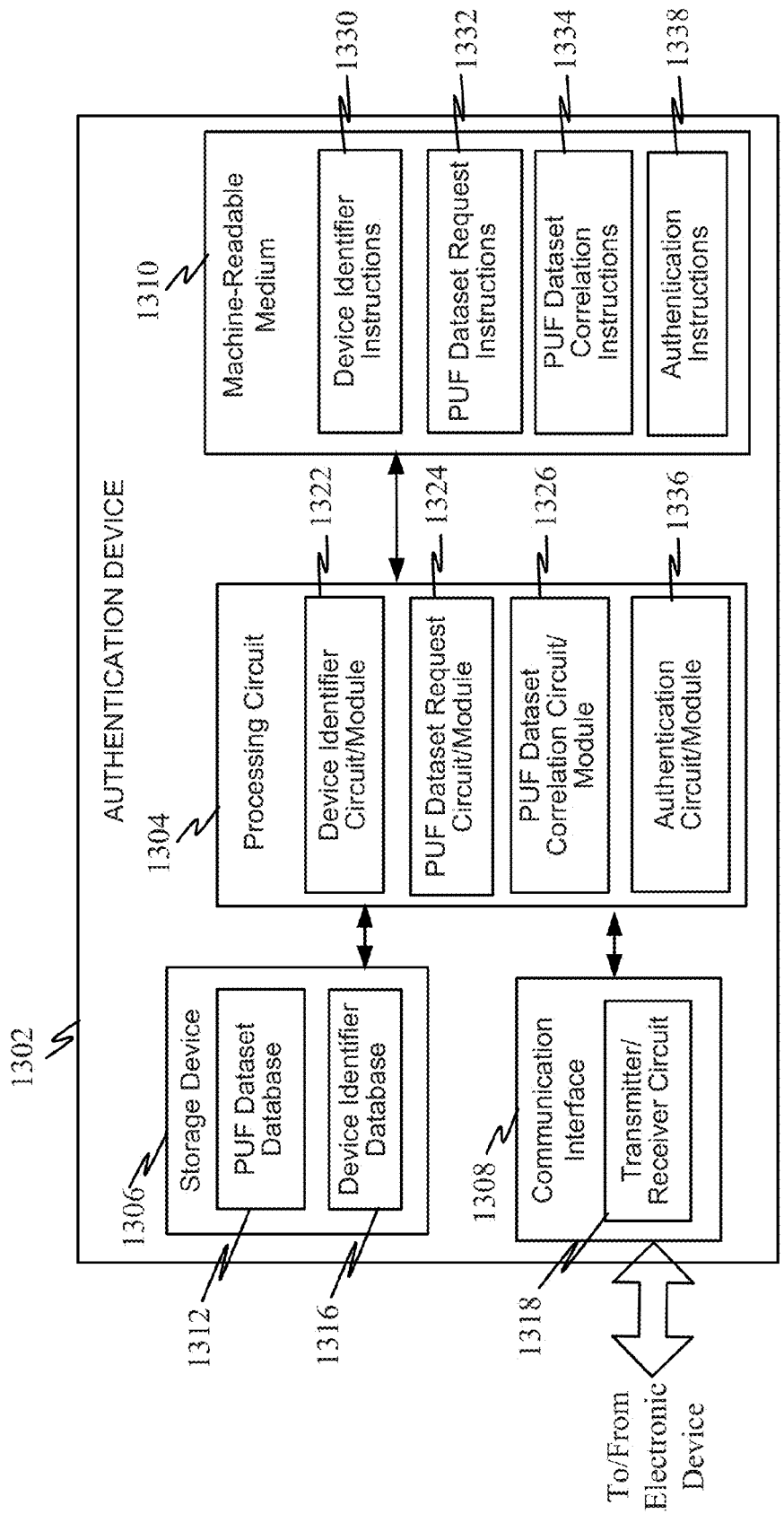
FIG. 13 is a block diagram illustrating an exemplary authentication device adapted to authenticate an electronic device based on a PUF dataset response from a physically unclonable function within each electronic device.

FIG. 13 is a block diagram illustrating an exemplary authentication device adapted to authenticate an electronic device based on a PUF dataset response from a physically unclonable function within each electronic device. The authentication device 1302 may be adapted to query an electronic device (e.g., chip, semiconductor, integrated circuit, processor, memory devices, etc.) and attempt to identify the electronic device based on a device identifier (e.g., obtained from the electronic device) and authenticate the electronic device by performing a correlation between a previously-obtained PUF dataset and a newly-obtained PUF dataset for the electronic device. The authentication device 1302 may include a processing circuit 1304, a storage device 1306, a communication interface 1308, and/or a machine-readable medium 1310. The communication interface 1308 may include a transmitter/receiver circuit 1318 that permits the authentication device 1302 to communicate (e.g., wired or wirelessly) with one or more electronic devices.

The processing circuit 1304 may include a device identifier circuit/module 1322 adapted to obtain a unique device identifier from an electronic device. Using the obtained device identifier, an authentication circuit/module 1336 may check a device identifier database 1316 (in the storage device 1306) for the corresponding PUF dataset request associated with that device identifier. The authentication circuit/module 1336 in cooperation with a PUF dataset request circuit/module 1324 may then send a PUF dataset request to the electronic device and obtains a PUF dataset response. The PUF dataset response, and a previously obtained PUF dataset response stored in the PUF dataset database 1312, may be used by a PUF dataset correlation circuit/module 1326 to ascertain whether a match exists. If a correlation above a threshold is found between the newly-obtained PUF dataset and the previously-obtained PUF dataset, the authentication circuit/module 1336 may conclude that the electronic device is successfully authenticated.

The machine-readable medium 1310 may include or store device identifier instructions 1330 (e.g., to cause the processing circuit to obtain a device identifier from an electronic device being verified), PUF Dataset Request instructions 1332 (e.g., to cause the processing circuit to obtain and send a PUF dataset request to the electronic device being verified), PUF Dataset Correlation instructions 1334 (e.g., to cause the processing circuit to correlate a previously-obtained PUF dataset and a newly-obtained PUF dataset for the electronic device being verified), and/or authentication instructions 1338 to ascertain whether a PUF authentication has been successful.

The authentication device 1302 may be adapted to perform one or more of the steps or functions illustrated in FIGS. 1-10.

Figure 14:
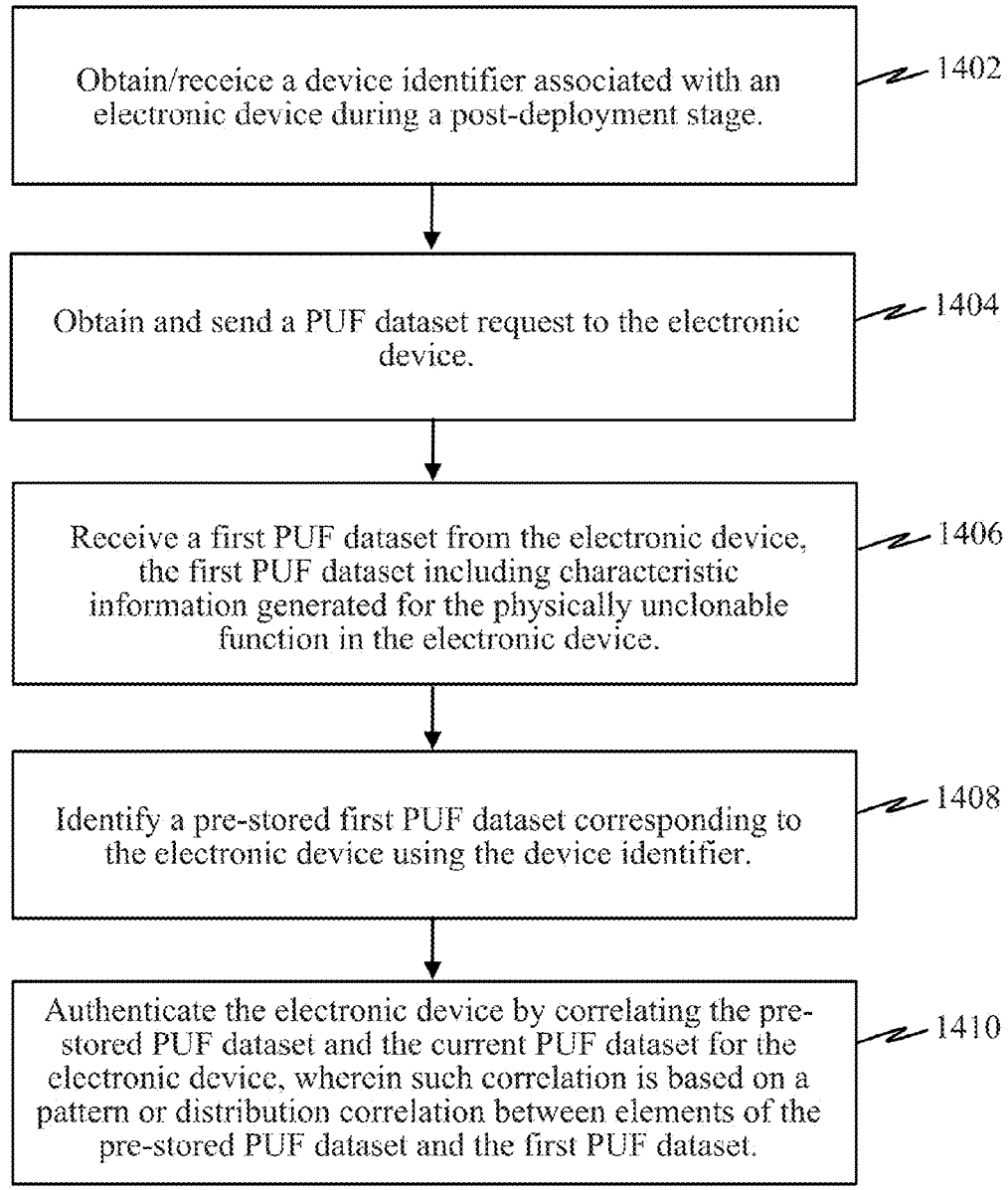
FIG. 14 illustrates a method operational in an authentication device for authenticating an electronic device by correlating PUF datasets for a physically unclonable function.

FIG. 14 illustrates a method operational in an authentication device for authenticating an electronic device by correlating PUF datasets for a physically unclonable function. The authentication device may obtain (e.g., request or receive) a device identifier associated with an electronic device during a post-deployment stage 1402. The authentication device may obtain and send a PUF database request to the electronic device 1404. For example, the PUF dataset request may be a pre-defined set of ring oscillators (e.g., all ring oscillators or a subset thereof) for the PUF utilized by electronic devices. Alternatively, the PUF dataset request may be a specific subset of elements (e.g., ring oscillators)

of the PUF utilized by the electronic device. For instance, the dataset request may identify elements corresponding to the pre-stored dataset for which new characteristic information is sought. The PUF dataset request may be obtained from a database using the device identifier.

In an alternative approach, the authentication device may not send a PUF dataset request at all. Instead, it may simply receive a PUF dataset from the electronic device (possibly with the device identifier) as part of an identification, verification, and/or authentication process.

The authentication device may receive a first PUF dataset from the electronic device, the first PUF dataset including characteristic information generated for the physically unclonable function in the electronic device 1406.

The device identifier may be used to identify a pre-stored PUF dataset specific to the electronic device 1408. The authentication device may then authenticate the electronic device by correlating the pre-stored PUF dataset and the first PUF dataset for the electronic device 1410, wherein such correlation is based on a pattern or distribution correlation between elements of the pre-stored PUF dataset and the first PUF dataset. Successful authentication occurs when the pre-stored PUF dataset and received PUF dataset correlate above a threshold.

In various implementations, the authentication device may operate as illustrated and described with reference to FIGS. 1-10.

Exemplary Electronic Device and Method Operational Therein

Figure 15:
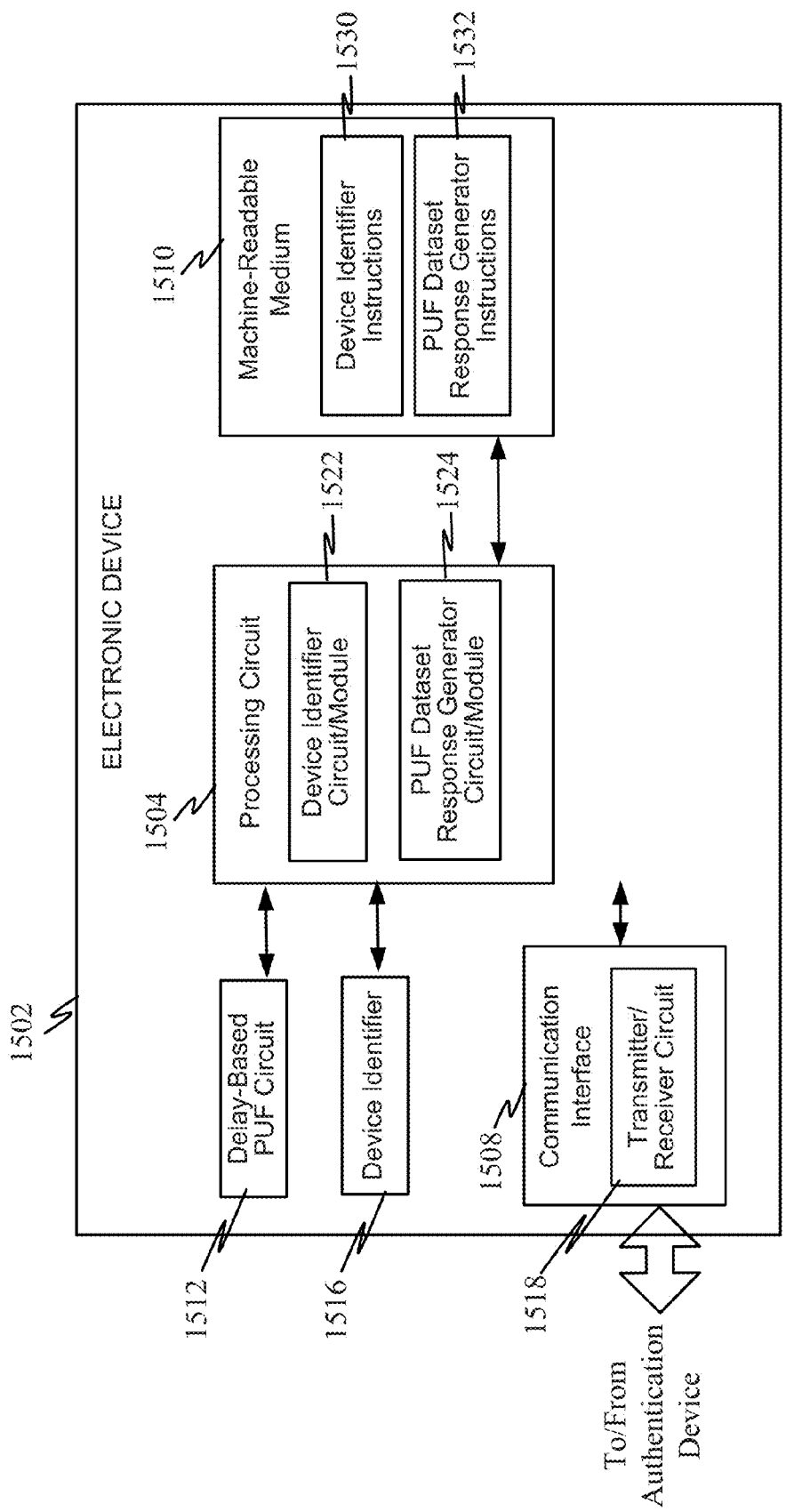
FIG. 15 is a block diagram illustrating an exemplary electronic device having a physically unclonable function.

FIG. 15 is a block diagram illustrating an exemplary electronic device having a physically unclonable function. The electronic device 1502 may be a chip, semiconductor, integrated circuit, processor, memory device, etc., and adapted to provide a device identifier and PUF dataset for purposes of authentication and/or identification of the electronic device. The electronic device 1502 may include a processing circuit 1504, a device identifier 1516 (in a storage device), a delay-based PUF circuit 1512 (e.g., plurality of oscillator ring circuits), a communication interface 1508, and/or a machine-readable medium 1510. The communication interface 1508 may include a transmitter/receiver circuit 1518 that permits the electronic device 1502 to communicate (e.g., wired or wirelessly) with one or more data collector and/or authentication devices.

The processing circuit 1504 may include a device identifier circuit/module 1522 adapted to provide its unique device identifier 1516 to a data collector and/or authentication device. The processing circuit 1504 may also include a PUF Dataset Response generator circuit/module 1524 adapted to obtain frequency values from a plurality of ring oscillators of the of the delay-based PUF circuit 1512. The PUF Dataset Response may then be sent to a data collector device and/or authentication devices.

The machine-readable medium 1510 may include or store device identifier instructions 1530 (e.g., to cause the processing circuit to obtain the device identifier 1116 for the electronic device), PUF Dataset response generator instructions 1532 (e.g., to cause the processing circuit to obtain a PUF dataset from the delay-based PUF circuit 1512 of the electronic device). This PUF dataset may then be transmitted over the communication interface 1508.

The electronic device 1502 may be adapted to perform one or more of the steps or functions illustrated in FIGS. 1-10.

Figure 16:
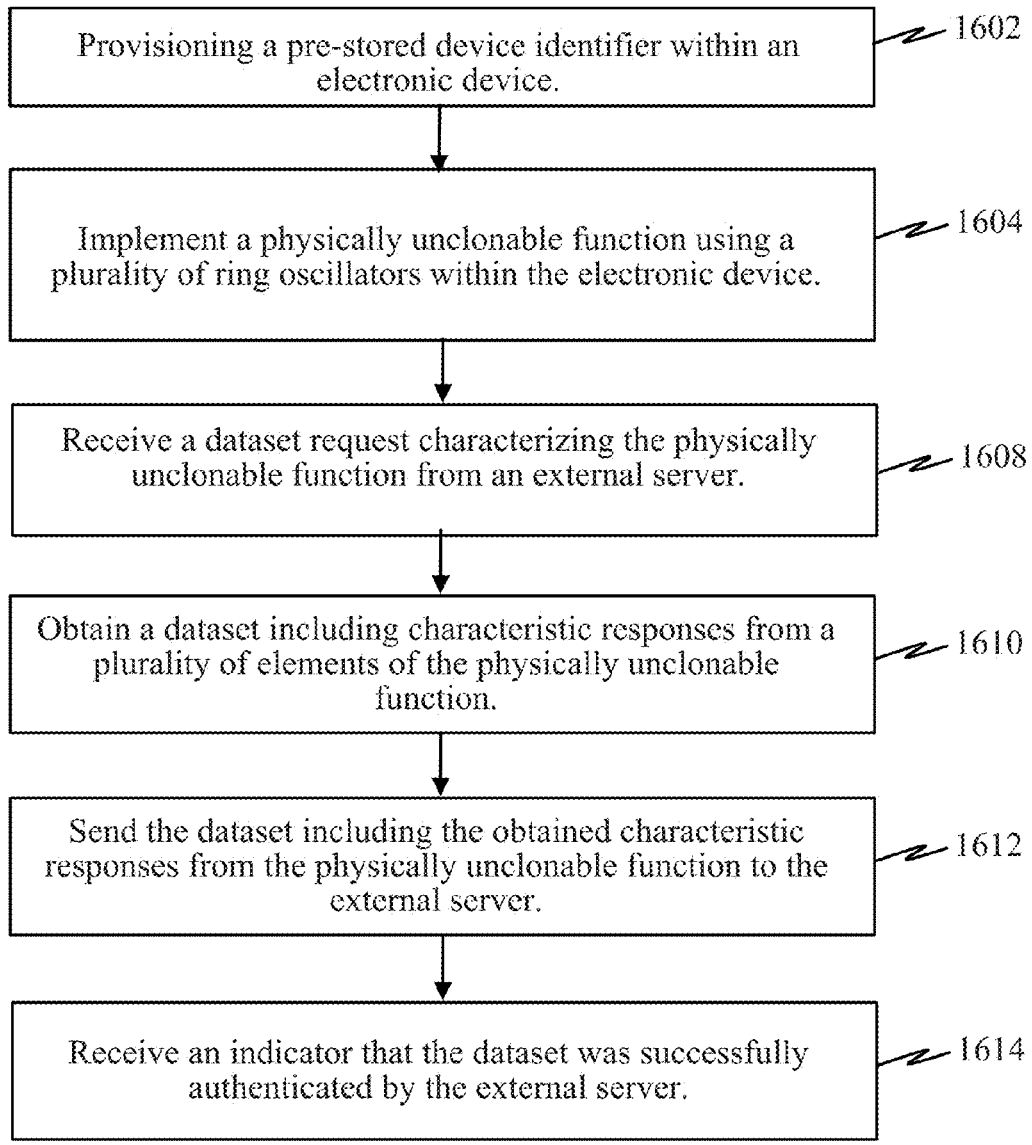
FIG. 16 illustrates a method operational in an electronic device for authenticating itself with an authentication device based on dataset from a physically unclonable function.

FIG. 16 illustrates a method operational in an electronic device for authenticating itself with an authentication device based on dataset from a physically unclonable function. The electronic device may have provided a dataset of characteristic information for its physically unclonable function during a pre-deployment or manufacturing phase.

In one example, a pre-stored device identifier may be pre-provisioned within the electronic device 1602. For instance the pre-stored device identifier from the electronic device to the external server either: (a) before a dataset request is received, or (b) concurrent with sending of a dataset to a authentication device. The device identifier uniquely identifies the electronic device.

The electronic device implements a physically unclonable function using a plurality of ring oscillators within the electronic device 1604.

A dataset request characterizing the physically unclonable function may be received from an external server 1606. In one example, the dataset request may identify that all elements (e.g., ring oscillators, circuit delay paths, etc.) of the physically unclonable function provide a characteristic response (e.g., frequency value, etc.). In another example, the dataset request may identify specific elements of the physically unclonable function that should provide a characteristic response (e.g., frequency value, etc.). In one instance, the dataset request may cause that characteristic responses (e.g., frequency values) from all or some elements (e.g., ring oscillators) of the physical unclonable function be obtained 1608. The dataset including the obtained characteristic responses from the physically unclonable functions may be sent to the external server 1610.

According to yet another aspect, the datasets sent by an electronic device to an authentication device may be stored and/or used in subsequent authentications. For example, if a first dataset sent by the electronic device is successfully authenticated by the authentication device, the first dataset may be stored for subsequent use. In subsequent authentication operations, the authentication device may use a prestored dataset and/or other subsequently obtained datasets (that were previously successfully authenticated against the prestored dataset) to correlate against a newly sent dataset from the electronic device. For instance, as an electronic device ages, the response of the PUF may change. This may lead to successful correlations (at a lower correlation value) or unsuccessful correlations. By storing some of the successfully authenticated datasets sent by an electronic device, the authentication device can compare a newly sent dataset against the prestored dataset and/or one or more other datasets that were previously successfully authenticated for the electronic device. If an authentication with the prestored dataset fails, the authentication device may then attempt a correlation with a later stored dataset (sent by the electronic device) to ascertain if there is a successful correlation.

In some instances, only if a correlation between the prestored dataset and a first dataset received from the electronic device is above a first threshold (i.e., successful authentication threshold) but below a second threshold, does the first data set get stored and potentially used for subsequent authentication of other datasets sent by the electronic device.

An indicator may be received that the dataset was successfully authenticated by the external server 1614. For instance, upon successful authentication, the electronic device may receive an indicator that it has gained access to a network and/or data.

One or more of the components, steps, features, and/or functions illustrated in FIGS. 1-10 may be rearranged and/or combined into a single component, step, feature or function or embodied in several components, steps, or functions.

Additional elements, components, steps, and/or functions may also be added without departing from the invention. The apparatus, devices, and/or components illustrated in FIGS. 1-3, 10, 11, 13, and 15 may be configured to perform one or more of the methods, features, or steps described in FIGS. 4-9, and 12, 14 and 16. The algorithms described herein may also be efficiently implemented in software and/or embedded in hardware.

Moreover, in one aspect of the disclosure, the processing circuit 1104, 1304 and 1504 illustrated in FIGS. 11, 13, and 15 may be specialized processors (e.g., an application specific integrated circuit (e.g., ASIC)) that are specifically designed and/or hard-wired to perform the algorithms, methods, and/or steps described in FIGS. 12, 14, and 16, respectively. Thus, such a specialized processor (e.g., ASIC) may be one example of a means for executing the algorithms, methods, and/or steps described in FIGS. 12, 14, and 16.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational by an authentication device, comprising:
   receiving a device identifier associated with an electronic device;
   receiving a first physically unclonable function (PUF) dataset from the electronic device, the first PUF dataset including characteristic information generated from a physically unclonable function in the electronic device;
   identifying a pre-stored PUF dataset corresponding to the electronic device using the device identifier; and
   authenticating the electronic device by correlating the pre-stored PUF dataset and the first PUF dataset for the electronic device, wherein such correlation is based on a pattern or distribution correlation between elements of the pre-stored PUF dataset and the first PUF dataset that distinguishes systematic variations from random variations in the correlation.

2. The method of claim 1, further comprising:
sending a dataset request to the electronic device prior to receiving the first PUF dataset.

3. The method of claim 2, wherein the dataset request identifies elements corresponding to the pre-stored dataset for which new characteristic information is sought.

4. The method of claim 2, further comprising:
obtaining the dataset request based on the device identifier.

5. The method of claim 1, wherein the pre-stored PUF dataset is obtained at a manufacturing stage or pre-deployment stage of the electronic device.

6. The method of claim 1, wherein the characteristic information generated from the physically unclonable function includes information for individual elements of the physically unclonable function.

7. The method of claim 1, wherein the characteristic information generated from the physically unclonable function includes frequency values for individual ring oscillators of the physically unclonable function.

8. The method of claim 1, wherein correlating the pre-stored PUF dataset and the first PUF dataset for the electronic device includes obtaining a Pearson product-moment correlation coefficient over the pre-stored PUF dataset and the first PUF dataset.

9. The method of claim 8, wherein if the correlation coefficient is greater than a threshold value, then the electronic device is successfully authenticated.

10. The method of claim 1, wherein if authentication is successful, further comprising:
storing the first PUF dataset along with the pre-stored PUF dataset for correlations with other datasets subsequently sent by the electronic device.

11. The method of claim 10, wherein only a subset of all successfully authenticated datasets sent by the electronic device are stored by the authentication device for correlations with the other datasets subsequently sent by the electronic device.

12. An authentication device, comprising:
a communication interface to communicate with an electronic device;
a processing circuit coupled to the communication interface, wherein the processing circuit is adapted to:
receive a device identifier associated with the electronic device;
receive a first physically unclonable function (PUF) dataset from the electronic device, the first PUF dataset including characteristic information generated from a physically unclonable function in the electronic device;
identify a pre-stored PUF dataset corresponding to the electronic device using the device identifier; and
authenticate the electronic device by correlating the pre-stored PUF dataset and the first PUF dataset for the electronic device, wherein such correlation is based on a pattern or distribution correlation between elements of the pre-stored PUF dataset and the first PUF dataset that distinguishes systematic variations from random variations in the correlation.

13. The authentication device of claim 12, wherein the processing circuit is further adapted to:
send a dataset request to the electronic device prior to receiving the first PUF dataset.

14. The authentication device of claim 13, wherein the dataset request identifies elements corresponding to the pre-stored dataset for which new characteristic information is sought.

15. The authentication device of claim 13, wherein the processing circuit is further adapted to:
obtain the dataset request based on the device identifier.

16. The authentication device of claim 12, wherein the pre-stored PUF dataset is obtained at a manufacturing stage or pre-deployment stage of the electronic device.

17. The authentication device of claim 12, wherein the characteristic information generated from the physically unclonable function includes information for individual elements of the physically unclonable function.

18. The authentication device of claim 12, wherein the characteristic information generated from the physically unclonable function includes frequency values for individual ring oscillators of the physically unclonable function.

19. The authentication device of claim 12, wherein correlating the pre-stored PUF dataset and the first PUF dataset for the electronic device includes obtaining a Pearson product-moment correlation coefficient over the pre-stored PUF dataset and the first PUF dataset.

20. The authentication device of claim 12, wherein if authentication is successful, the processing circuit is further adapted to:
store the first PUF dataset along with the pre-stored PUF dataset for correlations with other datasets subsequently sent by the electronic device.

21. The authentication device of claim 20, wherein only a subset of all successfully authenticated datasets sent by the electronic device are stored by the authentication device for correlations with the other datasets subsequently sent by the electronic device.

22. A non-transitory machine-readable storage medium having one or more instructions stored thereon, which when executed by at least one processor causes the at least one processor to:
receive a device identifier associated with an electronic device;
receive a first physically unclonable function (PUF) dataset from the electronic device, the first PUF dataset including characteristic information generated from a physically unclonable function in the electronic device;
identify a pre-stored PUF dataset corresponding to the electronic device using the device identifier; and
authenticate the electronic device by correlating the pre-stored PUF dataset and the first PUF dataset for the electronic device, wherein such correlation is based on a pattern or distribution correlation between elements of the pre-stored PUF dataset and the first PUF dataset that distinguishes systematic variations from random variations in the correlation.

23. The non-transitory machine-readable medium of claim 22, wherein if authentication is successful, the one or more instructions cause the at least one processor to:
store the first PUF dataset along with the pre-stored PUF dataset for correlations with other datasets subsequently sent by the electronic device.

24. The non-transitory machine-readable medium of claim 23, wherein only a subset of all successfully authenticated datasets sent by the electronic device are stored by the authentication device for correlations with the other datasets subsequently sent by the electronic device.

25. The method of claim 1, wherein authenticating the electronic device further includes correlating the systematic variations of the pre-stored PUF dataset and the first PUF dataset for the electronic device.

26. The method of claim 1, wherein the pattern or distribution correlation between elements comprises a measure of dependence between arrays of the elements of the pre-stored PUF dataset and the first PUF dataset.

* * * * *